Dec. 13, 1932.    S. B. SMITH    1,890,953
VALVE
Filed March 7, 1929    2 Sheets-Sheet 1

INVENTOR.
SAMUEL B. SMITH.
BY Ely and Barrow.
ATTORNEYS.

Dec. 13, 1932.  S. B. SMITH  1,890,953
VALVE
Filed March 7, 1929  2 Sheets-Sheet 2
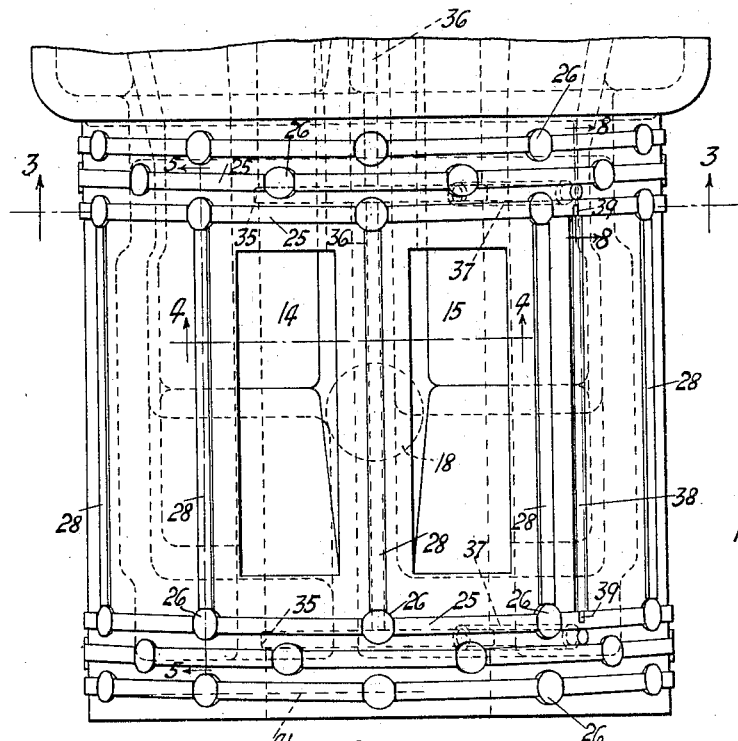
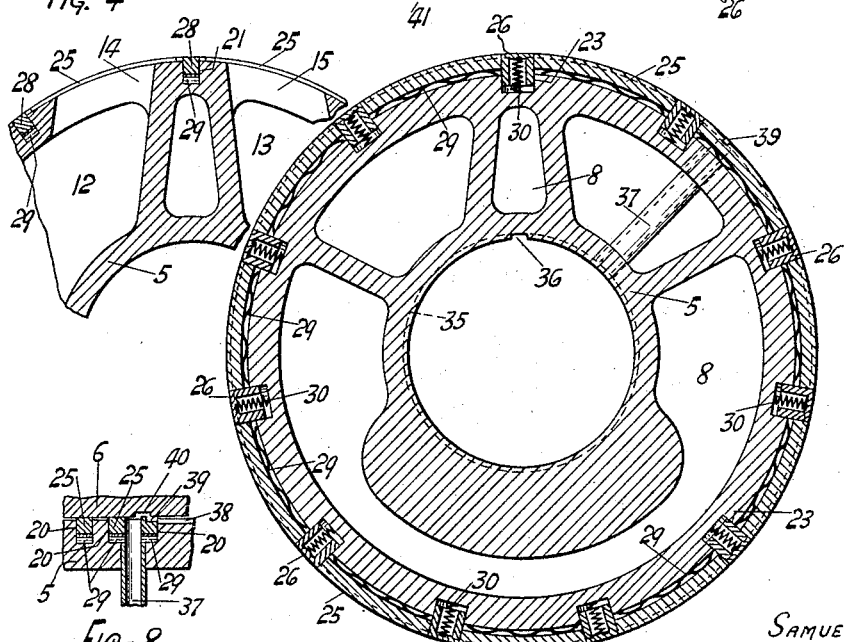
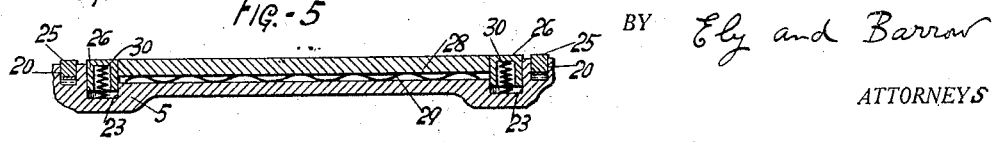
INVENTOR.
SAMUEL B. SMITH.
BY Ely and Barrow
ATTORNEYS Patented Dec. 13, 1932

1,890,953

UNITED STATES PATENT OFFICE

SAMUEL B. SMITH, OF CLEVELAND, OHIO

VALVE

Application filed March 7, 1929. Serial No. 345,029.

The present invention relates to improvements in valves and more particularly in rotary or like ported valves. While the valve shown and described herein is especially adapted and intended for use in a rotary engine of the internal combustion type, its use is not necessarily limited to engines, but may be extended to other devices. One principal object of the invention is to provide an effective seal both laterally or axially and also circumferentially of the port or ports in the valve and, stated broadly, the invention secures an efficient seal between parts of a valve having elements which oscillate, rotate or otherwise move transversely with respect to one another.

The construction shown provides an effective seal which will withstand the extremely high pressures developed within the engine, and by the use of which the pressures within the structure will be confined in all directions. A further object is to provide means for lubricating the parts of such a valve. Still other objects of the invention are to provide a valve of the type shown which will not be subject to undue wear, and to otherwise improve upon devices of this type.

While the description and drawings accompanying this application are detailed in order to enable those skilled in the art to understand the invention, it will be apparent that the details need not be followed in specific embodiments of the invention and that changes and modifications may be made therein within the scope of the claims.

In the drawings, which show the preferred form of the invention as known to me at the present time:

Figure 2 is a plan view of the central or valve portion of the device, looking at the under side of the valve as shown in Figure 1;

Figure 3 is a section on the line 3—3 of Figure 2;

Figure 4 is a section through the ports of the valve on the line 4—4 of Figure 2;

Figure 5 is a section on the line 5—5 of Figure 2;

Figure 8 is a sectional detail, the plane of the section being indicated by the line 8—8, Figure 2.

Figure 1:
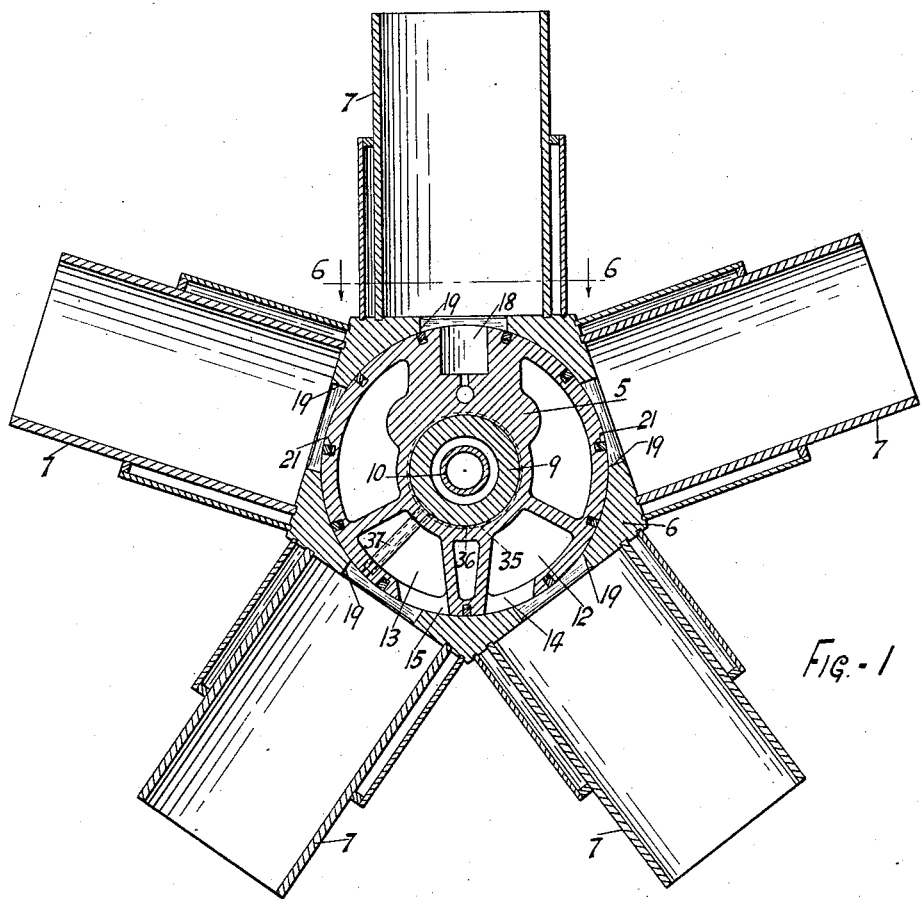
Figure 1 is a sectional view taken at right angles to the axis of the rotary valve, showing the central valve member and the outer casing or cylinder block.
Figure 6:
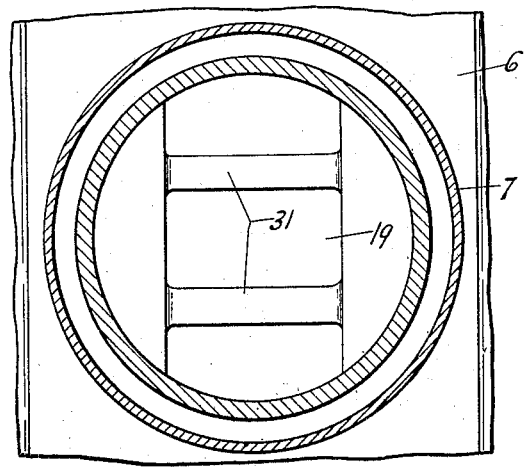
Figure 6 is a section on the line 6—6 of Figure 1.
Figure 7:
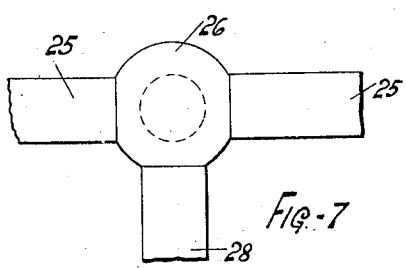
Figure 7 is an enlarged detail view.

The valve mechanism comprises a valve 5 and an outer casing or block 6 which supports the several cylinders 7 of the rotary engine. The details of the engine are omitted from the present application as they have no bearing upon the invention here presented. The parts 5 and 6 are rotative relative to one another, either of the parts may be stationary. In the specific embodiment of the invention, the valve 5 is stationary and the part 6 rotates about the valve.

The interior of the valve 5 is cored for the circulation of water, as shown at 8, and centrally of the valve is a shaft 9 which is hollow and provided with a tube 10 for the circulation of water. Located within the valve are passages 12 and 13 for the admission of the air for combustion and for the escape of the products of combustion. From the passages extend the two ports 14 and 15, respectively, which open on the outer surface of the valve, being elongated so as to afford openings of sufficient size to adequately serve the purpose for which they are intended. At another point, usually placed diametrically opposite the ports 14 and 15, is located a firing chamber 18. The explosive mixture which has been compressed at the time it reaches the point 18 is exploded and the force of the explosion converted into rotary motion of the parts of the apparatus. At the inner end of each cylinder is a port 19 adapted to register with the several ports on the valve center.

The means for effectively sealing the space between the two parts of the valve structure will now be described.

Grooves 20 are provided on each side of the ports, extending around the circumference of the valve 5, there being shown three parallel grooves at each side of the valve, although the number of grooves may be varied. In the space between the grooves at opposite sides of the ports are located a plurality of parallel, intersecting grooves 21 which are spaced about the valve body, eleven of these grooves being shown.

Located at the intersection of the grooves 21 and the innermost circular grooves 20 are sockets or recesses 23 which are deeper than the grooves 20. Similar sockets are also located in the other circular grooves, but are placed in staggered relation, as shown in Figure 2. The recesses 23 divide the grooves into a plurality of short sections and in each of these sections is located an arc-shaped bar or segment of a ring 25. Located in each recess or socket is a pin 26 which extends beneath the bottom of the grooves, so that the pins form barriers at the ends of the longitudinal grooves and sections of the circumferential grooves, the ends of each of the segments of the rings abutting the pins. In the transverse grooves 21 are located the bars 28, the ends of which also abut the pins 26. Within the grooves 20 and 21 and beneath the segments 25 and the cross bars 28 are located springs, such as the undulatory spring members 29, illustrated in Figures 3 and 5, and within the pins 26 are seated the coil springs 30. The several spring devices press the segments, cross bars and pins outwardly to make a close fitting contact with the inner wall of the cylinder block. While the various elements 25, 26 and 28 are fitted as closely as practicable in the member 5, the pressure will force them against the sides of their respective seats and maintain a substantially leakproof condition.

It is preferable to form the ends of the bars 25 and 28 flattened and to provide similar flat faces on the sides of the pins against which the ends of the bars contact, so as to prevent rotation of the pins in their sockets.

In order to prevent possible loss of the transverse bars 28 in passing the ports 14 and 15, ribs 31 may be formed over the openings 19.

It is believed that the invention as disclosed represents a highly efficient and practical rotary valve mechanism which will be especially useful in the perfection of internal combustion engines of the rotary type. The pressure within the valve is sealed laterally by the several arc-shaped segmental strips or bars 25 and circumferentially by the transverse bars 28. Leakage at the ends of the sectional grooves and around the ends of the bars is prevented by the pins 26. The pins 26 also prevent rotation of the rings in the grooves which, if permitted, might cause the rings to wear or to bind.

For the purpose of insuring proper lubrication between the contacting faces of the fixed and movable valve parts, the following arrangement of oil grooves is provided. As best shown in Figs. 1 and 3, a plurality of encircling grooves 35 are formed in the inner surface of the fixed valve member to which oil is supplied under pressure from an exterior source, not shown, through a longitudinal groove 36 in the inner face of member 5. Each such groove 35 is placed in communication with the exterior surface of said valve member by means of a duct 37 that, as shown, opens at its outer end in the space or rather land between the two innermost ring receiving grooves on such valve member. Sufficient oil under pressure will thus be supplied to each such groove and to the contacting surfaces of the fixed and rotary valve parts lying on either side thereof. In order to insure adequate lubrication of the rotary valve surface lying between the respective sets of circumferential grooves, the points where the ducts 37 thus open are disposed opposite the respective ends of a transverse oil groove 38 in the valve surface in question, and the adjacent segmental rings are provided with a notch 39, as best shown in Figs. 2 and 8. A short groove or notch 40, as shown in such last mentioned figure, is also cut at a suitable point in the inner surface of the rotary valve member so as to bridge such notch 39 and the opening in the end of duct 37 once for each rotation of the rotary valve member. Each time this occurs oil will be permitted to flow from the duct into such transverse groove 38 so as to keep the latter filled and the oil thus received in the groove will in turn be spread on the surface of the interior valve member.

Changes and modifications which may be made without affecting the principles of the invention are intended to be covered in the appended claims. The principles of the invention are not necessarily confined to a rotary valve constructed as shown, but may, within the scope of the invention, be applied to rotary valves of other types, as, for example, to a rotary valve of the disk or plate type, the arrangement of the several bars and ring segments being adapted to the particular form of valve. The valve is, furthermore, not limited to use in internal combustion engines, but may be used wherever a rotary valve is required.

In order to avoid tracking of the rings in a narrow groove about the interior of the outer casing, the plane of the grooves 20 may be inclined to the axis of the member 5. This is illustrated in Fig. 2, wherein the angular position of the grooves is shown by the dotted line 41. This arrangement avoids excessive wear in the casing.

What is claimed is:

1. In a valve construction, a valve having a port therein and a groove disposed alongside such port, such groove being provided with depressions intersecting its bottom at spaced points; barrier elements seated in such depressions and blocking the groove, and a sealing member fitted to such groove, the end of said member abutting said elements.

2. In a valve construction, a valve having a port therein and a groove disposed alongside such port, such groove being provided with depressions intersecting its bottom at spaced points lying on either side of such port, barrier elements seated in such depressions and blocking the groove, and a sealing member fitted to such groove, the end of said member abutting said elements.

3. In a valve construction, a valve having a port therein and a groove disposed alongside such port, such groove being provided with depressions intersecting its bottom at spaced points, pins seated in such depressions and blocking the groove, a bar fitted to such groove, the end of said bar abutting said pins, and resilient means tending to force said pins and bar outwardly.

4. In a valve construction, a valve having a port therein and a groove disposed alongside such port, such groove being provided with depressions intersecting its bottom at spaced points lying on either side of such port, pins seated in such depressions and blocking the groove, a bar fitted to such groove, the end of said bar abutting said pins, and resilient means tending to force said pins and bar outwardly.

5. In a rotary valve construction, a valve, a port in the valve, a circular groove at the side of the port, recesses in the groove and extending below the base of the groove, pins seated in the recesses, and segmental rings within the groove, the ends of the rings abutting the pins.

6. In a rotary valve construction, a valve, a port in the valve, circular grooves at the sides of the port, intersecting grooves connecting the circular grooves, recesses at the intersections of said grooves, said recesses being deeper than the grooves, pins located in the recesses, and sealing members located in the grooves and abutting the pins.

7. In a rotary valve construction, a valve, a port in the valve, circular grooves at the sides of the port, intersecting grooves connecting the circular grooves, recesses at the intersections of said grooves, said recesses being deeper than the grooves, pins located in the recesses, sealing members located in the grooves and abutting the pins, and springs to force the pins and sealing members outwardly.

8. In a rotary valve construction, a valve, a casing surrounding the valve, the valve and the casing having rotary movement with respect to one another, circular grooves on opposite sides of the valve opening, segmental sealing rings in the grooves, spring means to force the ring segments against the casing, and means for preventing rotation of the rings in the grooves.

9. In a rotary valve construction, a valve, a casing surrounding the valve, the valve and the casing having rotary movement with respect to one another, a circular groove in the valve, a segmental sealing ring in the groove, means for preventing rotation of the ring in the groove, an intersecting groove located in the valve, and a transverse bar in the intersecting groove.

10. In a device of the character described, a valve having a port and a casing having a port adapted to be brought into registry with the port on the valve, a plurality of grooves surrounding the valve port, segmental sealing means located in said grooves, springs to force the sealing means outwardly, and means to prevent movement of the sealing means about the valve.

11. In a device of the character described, a valve having a port and a casing having a port adapted to be brought into registry with the valve port, a plurality of spaced circular grooves in the valve at the sides of the ports, a set of segmental arc-shaped bars located in the grooves, pins seated in the valve and located between the ends of adjacent bars, and springs beneath the bars and the pins.

12. In a device of the character described, a valve having a plurality of ports and a casing surrounding the valve, a plurality of transverse grooves located about the valve, circular grooves at the ends of the transverse grooves, spring pressed pins located at the intersections of the grooves, and spring pressed bars seated in the circular and transverse grooves.

13. In a device of the character described, a valve having a plurality of ports and a casing surrounding the valve, a plurality of transverse grooves located about the valve, circular grooves at the ends of the transverse grooves, spring pressed pins located at the intersections of the grooves and anchored in the valve, and spring pressed bars seated in the circular and transverse grooves.

14. In a device of the character described, a valve having a plurality of ports and a casing surrounding the valve, a plurality of transverse grooves located about the valve, circular grooves at the ends of the transverse grooves, spring pressed pins located at the intersections of the grooves, spring pressed bars seated in the grooves, additional circular grooves on the sides of the first named grooves, and spring pressed bars and pins located in the additional grooves.

15. In a device of the character described, a valve having a plurality of ports and a casing surrounding the valve, a plurality of transverse grooves located about the valve, circular grooves at the ends of the transverse grooves, spring pressed pins located at the intersections of the grooves, spring pressed bars seated in the grooves, additional circular grooves on the sides of the first named grooves, and spring pressed bars and pins located in the additional grooves, the pins in adjacent circular grooves being staggered with respect to one another.

16. In a rotary valve, a central stationary valve, ports located therein, a rotary casing surrounding the valve, circular grooves on opposite sides of the ports, transverse grooves coextensive with the ports and arranged about the valve, recesses located in the circular grooves, spring pressed bars in the circular and transverse grooves, and spring pressed pins in the recesses and anchored in the valve, the ends of each bar contacting with the pins.

17. In a rotary valve, a stationary valve, ports located therein, a rotary casing surrounding the valve, circular grooves on opposite sides of the ports, recesses located in the circular grooves and extending below the base of the grooves, bars in the grooves, and pins in the recesses, the ends of each bar contacting with the pins.

18. In a rotary valve, a stationary valve, ports located therein, a rotary casing surrounding the valve, circular grooves on opposite sides of the ports, recesses located in the circular grooves and extending below the base of the grooves, bars in the grooves, and pins in the recesses, the ends of each bar contacting with the pins, the ends of the bars and the pins being so formed as to prevent rotation of the pins.

19. In a rotary valve, a stationary valve, a port located therein, a rotary casing surrounding the valve, and means to form a lateral seal at the side of said port comprising a plurality of segmental ring members seated in a circular groove on the stationary valve, pins located between the ends of adjacent segments and springs below the segments and pins and adapted to press them outwardly.

20. In a rotary valve, a stationary valve, a port located therein, a rotary casing surrounding the valve, and means to form a lateral seal at the side of said port comprising a plurality of segmental ring members seated in circular grooves on the stationary valve, pins located between the ends of adjacent segments and springs below the segments and pins and adapted to press them outwardly, the pins in adjacent grooves being staggered.

21. In a rotary valve, a stationary valve, a port located therein, a rotary casing surrounding the valve, means to form a lateral seal at the side of said port comprising a plurality of segmental ring members seated in circular grooves on the valve, pins located between the ends of adjacent segments and springs below the segments and pins and adapted to press them outwardly, and transverse bars coextensive with the ports and adapted to form circumferential sealing means.

22. In a rotary valve, a stationary valve, a port located therein, a rotary casing surrounding the valve, means to form a lateral seal at the side of said port comprising a plurality of segmental ring members seated in circular grooves on the valve, pins located between the ends of adjacent segments and springs below the segments and pins and adapted to press them outwardly, and transverse bars coextensive with the ports and adapted to form circumferential sealing means, the ends of said transverse bars bearing against the pins in the adjacent circular grooves.

23. In a rotary valve construction, a valve, a port therein, a circular groove in the valve, a segmental ring seated in the groove, and a plurality of barriers lying between the ring segments, said barriers preventing passage of gas about the groove.

24. In a rotary valve construction, a valve, a port therein, a circular groove in the valve, a segmental ring seated in the groove, and a plurality of barriers lying between the ring segments, said barriers preventing passage of gas about the groove and rotation of the segments in the groove.

25. In a rotary valve construction, a valve having a port therein and a circumferential groove disposed along one side of such port, and a sealing member fitted to such groove, said valve being further provided with an oil supply duct having an opening adjacent such groove and with a second groove transverse to such first groove adapted to receive oil from such duct opening, said sealing member being transversely slotted and the member wherewith said valve co-operates having a recess adapted to bridge such slot to permit flow of oil from said duct to such second groove in said valve.

SAMUEL B. SMITH.